UNITED STATES PATENT OFFICE.

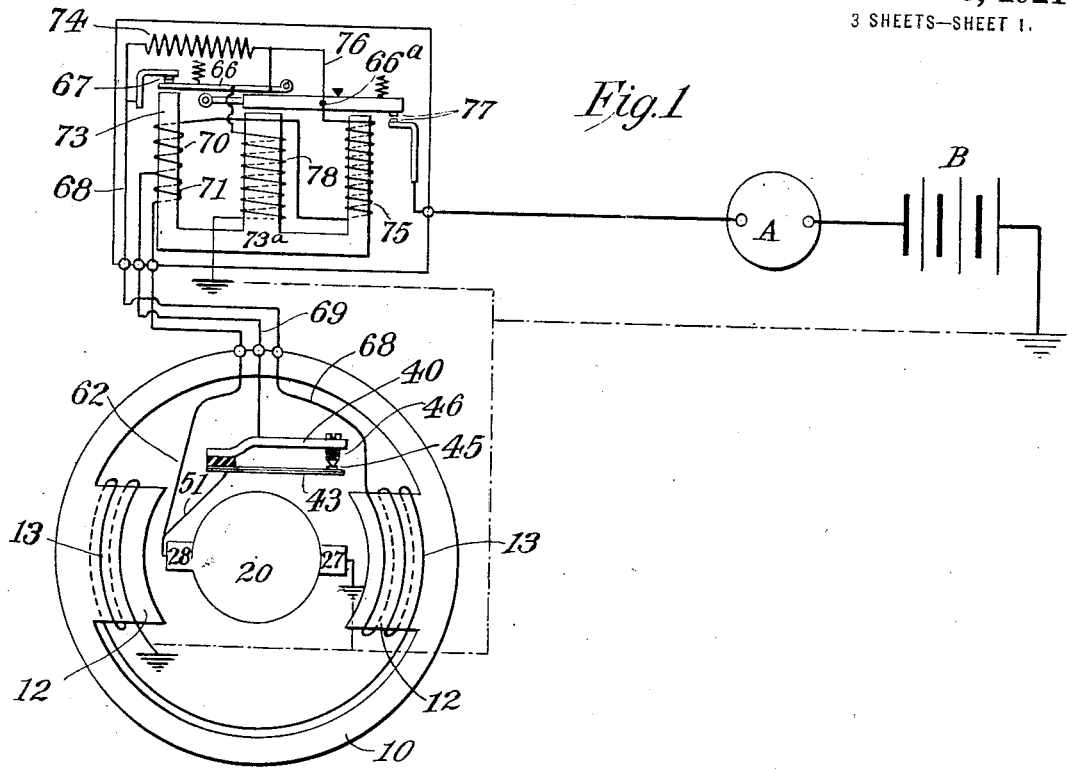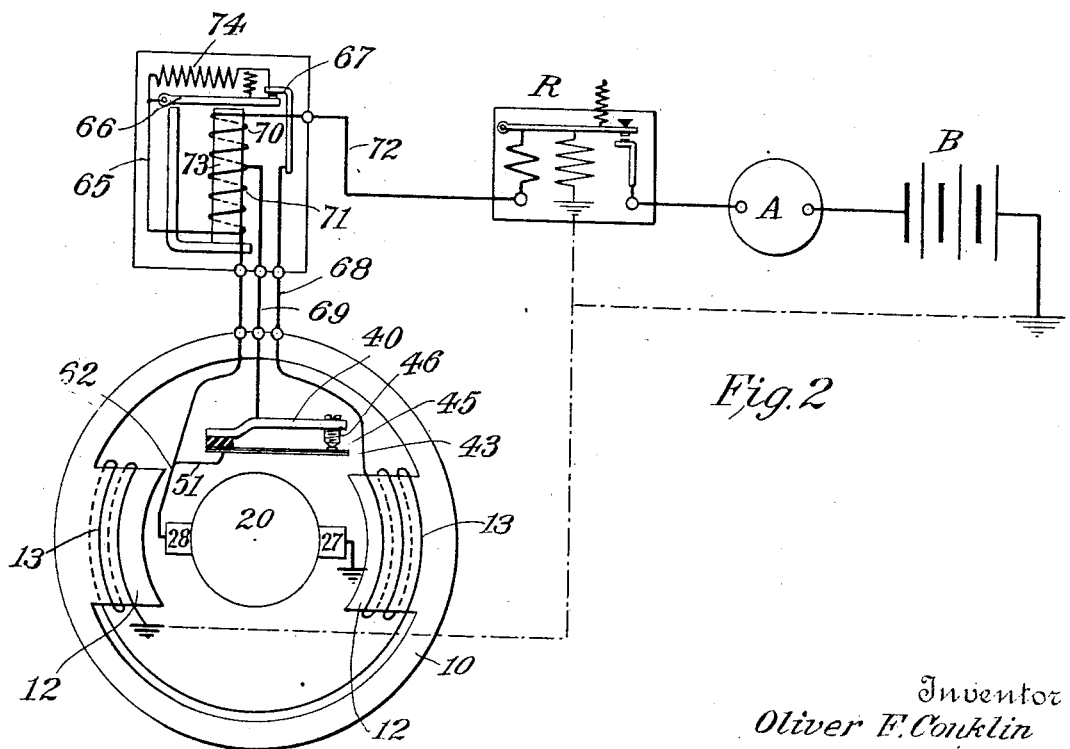

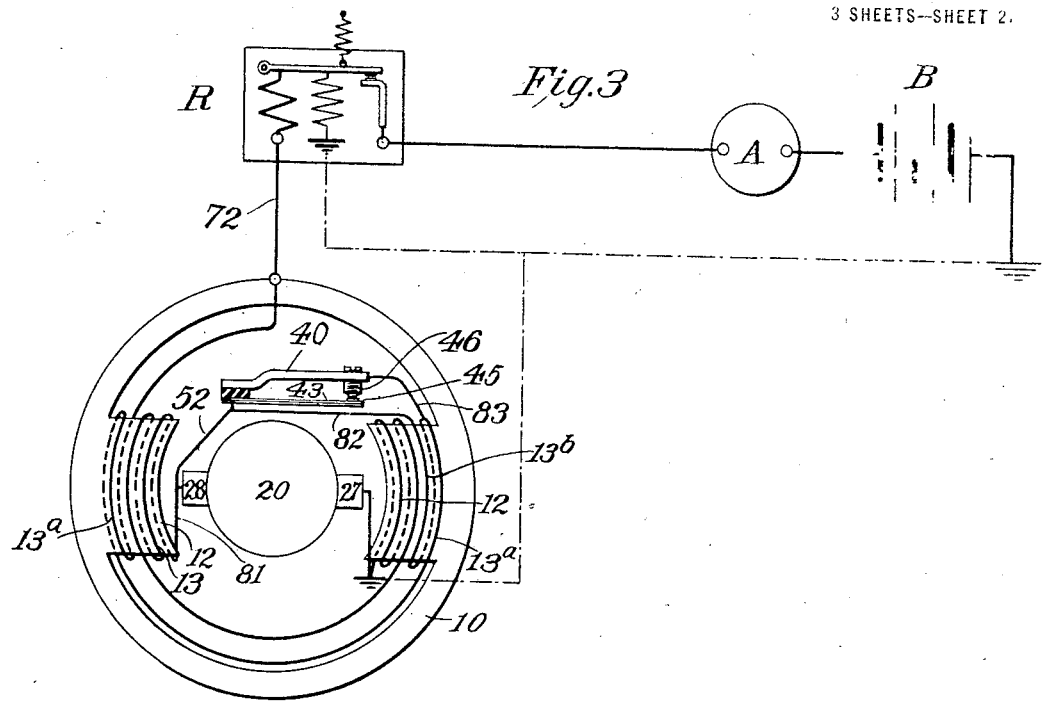
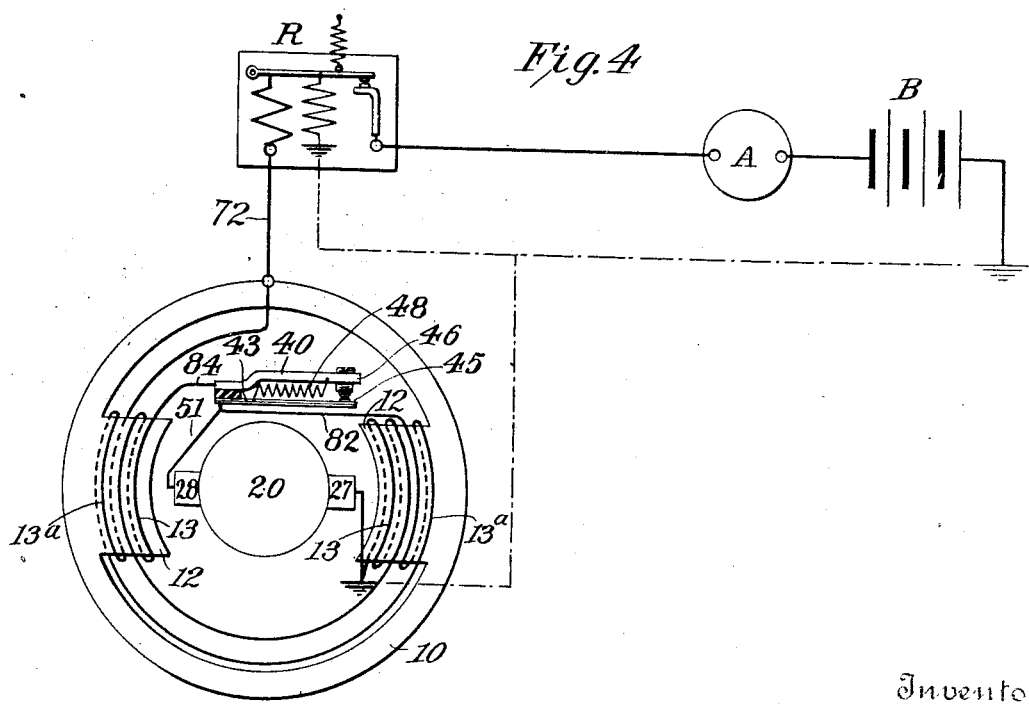

OLIVER F. CONKLIN, OF DETROIT, MICHIGAN, ASSIGNOR TO REMY ELECTRIC COMPANY, OF ANDERSON, INDIANA, A CORPORATION OF INDIANA.

REGULATING SYSTEM FOR DYNAMO-ELECTRIC MACHINES.

1,400,501.   Specification of Letters Patent.   Patented Dec. 13, 1921.

Application filed April 28, 1917. Serial No. 165,051.

*To all whom it may concern:*

Be it known that I, OLIVER F. CONKLIN, a citizen of the United States, and residing at Detroit, in the county of Wayne and State of Michigan, have invented certain new and useful Improvements in Regulating Systems for Dynamo-Electric Machines, of which the following is a full, clear, and exact description.

This invention relates to improvements in regulating devices for dynamo electric machines. In my Patent No. 1,352,051, issued Sept. 7, 1920, I have shown a thermostatic device which coöperates with a third brush to effect the regulation. In the present application a similar thermostat is used in combination with forms of regulating devices other than third brush.

In the drawing—

Figure 1 shows a dynamo electric machine of the shunt wound type having voltage current regulation in combination with a thermostatic device for modifying the action thereof.

Fig. 2 shows a modification in which a shunt wound machine is regulated by a current regulator which is combined with a thermostatic device.

Fig. 3 shows a dynamo electric machine having a bucking field regulation and in which the action of the bucking field is modified by a thermostatic device.

Fig. 4 shows a modification of the construction shown in Fig. 3 in which the shunt field is regulated by a thermostatic device.

Figure 5:
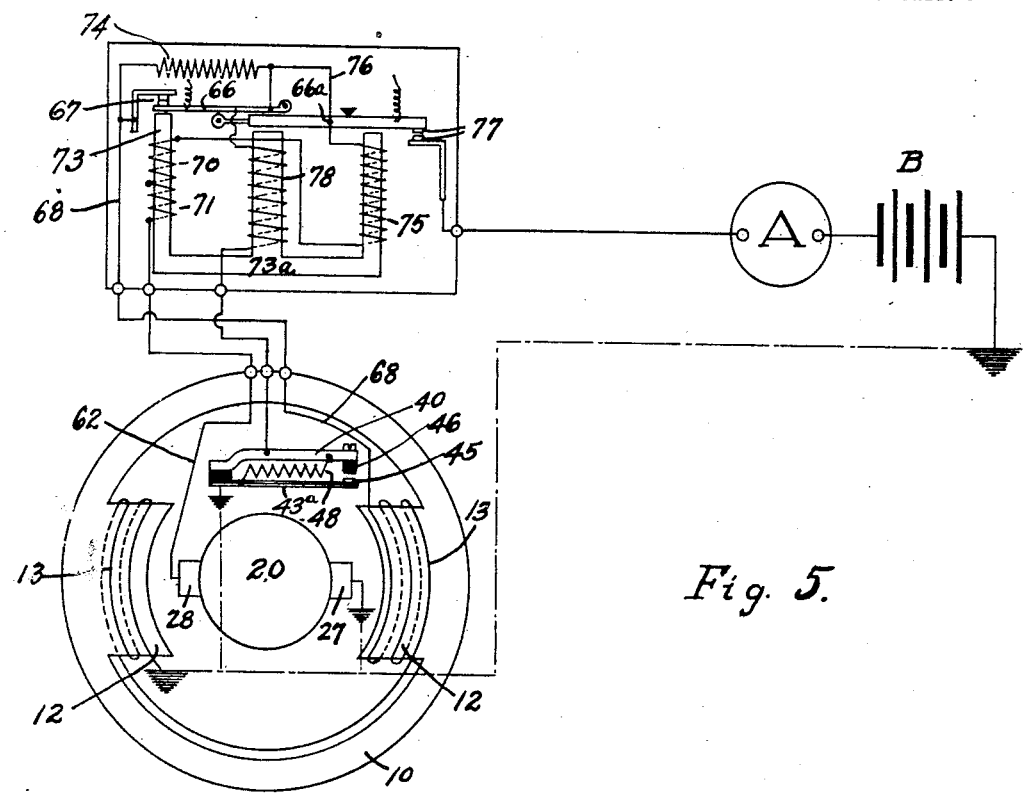
Figs. 5 and 6 show other modified forms of the invention.

In more detail in the drawings the dynamo electric machine 10 has pole pieces 12 with shunt field coils 13 wound thereon. In the construction shown in Figs. 3 and 4 there is also wound upon the field poles 12 bucking field coils 13ª. In the different figures R represents a reverse current relay, A an ammeter and B a battery. The translating devices or current consuming devices are not shown, but reference may be had to my patent for an illustrating of these devices. In the construction shown in Fig. 1, the reverse current relay is made a part of the regulating device.

The generator in each figure is provided with the usual armature connected with commutator 20 with which brushes 27 and 28 coöperate. Preferably placed in heat receiving relation with the commutator there is a thermostatic regulating device. This device comprises a fixed member 40 and a bi-metallic member 43. 43 carries a contact 45, and 40 carries an adjustable contact 46. Upon a certain heat being attained the bi-metallic member 43 opens the contacts 45 and 46. As this thermostatic device was fully described in my Patent No. 1,352,051, no further description need be given here. Reference may be made to the aforesaid patent and similar reference characters will be found to correspond to similar parts of the thermostatic device.

*Combined current voltage regulator, reverse current cut-out and modifying thermostat.*

The arrangement and mode of operation of the apparatus as shown in Fig. 1 will now be described. Broadly speaking this apparatus comprises a combined current-voltage regulator having combined therewith a reverse current cut-out, together with a thermostatic device, which when it operates is adapted to modify the action of the voltage current regulator. In the ensuing description similar reference characters will be given, as far as possible, to corresponding parts in all of the figures.

As the armature of the machine starts to rotate, current will be generated and will flow from commutator 20, through brush 28, wire 51, bi-metallic thermostatic element 43, contacts 45, 46, member 40, wire 69, regulator current coil 70, reverse current relay series coil 75, wire 76, armature 66, contacts 67 (now closed), wire 68, through shunt field coil 13 to ground and back through brush 27 to the commutator.

Concurrently therewith current will flow from armature 66, through voltage-coil 78 to ground and back through brush 27 to the commutator 20. Voltage-coil 78 and current coil 75 will together draw down the armature 66ª and close contacts 77, thereby connecting the dynamo electric machine with the battery in the manner well known in reverse current cut-out devices. The purpose of the series coil 75 is to open the contacts 77, should the battery current flow back from battery B to the generator. As this structure is well known, no further description is believed to be necessary. As the current in coils 70 builds up the core 73 will be magnetized. This will draw down armature 66 and eventually open the contacts 67 and this opening of the contacts will insert the resistance 74 in series with the field coils 13, thereby cutting down the output of the machine. It will be understood that armature 66 will vibrate and rapidly open and close contacts 67, thereby cutting in and out the resistance 74 with respect to the field 13 of the machine. This will maintain the current at a substantially constant value as is customary in current regulators of this type. The core $73^a$ which is within voltage coil 78, is also energized and the magnetic flux from this core affects the armature 66 tending to cause it to open the contacts 67. It will therefore be seen that the voltage coil supplements the current coil 70 in regulating the machine, and thereby a regulation is obtained which is due to the combined action of both charging current and battery voltage. As this structure is well known no further description need be given.

When the thermostat 43, which is in heat receiving relation with the commutator heats up, the contacts 45 and 46 will be opened. Current can then no longer flow in wire 69, but all the current from brush 28 will flow through wire 62 and therefrom through coil 71, coil 70, and then through the circuit previously traced. By reason of the fact that there are an additional number of turns of wire around the core 73, namely, coils 71 and 70, there will be a higher magnetic flux in core 73. Consequently the armature 66 will remain open for a greater period of time and the output of current from the machine will be decidedly reduced. It will be understood that the opening of the thermostat 43 does not affect the regulation which is dependent upon the voltage coil 78, as a constant number of turns are always present in this voltage coil. A modified form of the invention is shown in Fig. 5, in which the current coil 70, 71 is not controlled by a thermostatic switch, but a resistance 48 is connected in series with the voltage winding 78. The thermostatic element $43^a$, which is constructed to bend when heated toward contact 46, will close contacts 45, 46 at a predetermined temperature. The resistance 48 will become short circuited, and the ampere-turns of voltage coil 78 will be increased. In this manner the action of the regulator will be modified in accordance with temperature changes to regulate at lower voltage as the temperature of the thermostat element $43^a$ increases.

Figure 6:
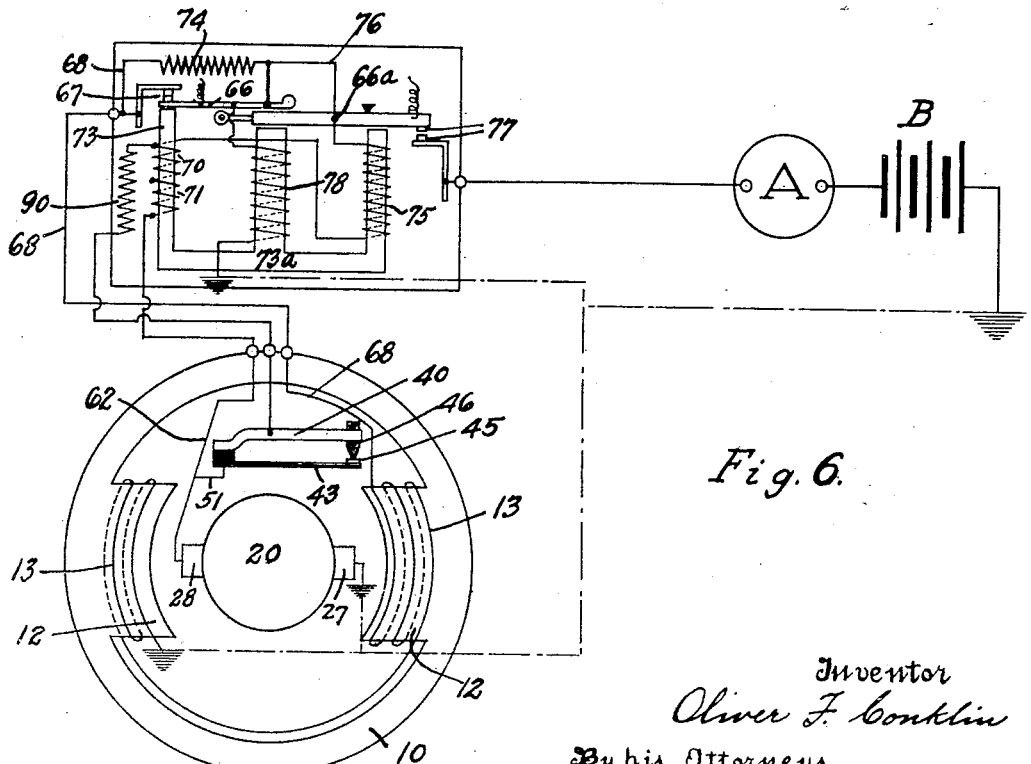

A further modified form of the invention is shown in Fig. 6, in which a resistance 90 is connected in parallel with current coil 70, 71, by a thermostatic switch. Switch contacts 45 and 46 are normally in engagement. The element 43 carrying contacts 45 is constructed so as to bend away from contact 46 with increasing temperature. Hence, at a predetermined temperature, contacts 45 and 46 will be separated and resistance 90 will no longer be effective. The ampere turns of coils 70, 71 will therefore be increased. In this manner the action of the regulator will be modified in accordance with temperature changes to give a reduced current output as the temperature of element 43 is increased.

*Combined current regulator with modifying thermostat.*

Referring now to Fig. 2 of the drawings, when the armature starts to rotate current will be generated and will flow from brush 28, wire 62, wire 65, armature 66, contact 67 (being closed), wire 68, through field coils 13 to ground and through the ground back to the commutator 20 through brush 27. The thermostat member being closed, current will also flow from brush 28 through wire 62, wire 51, bi-metallic member 43, contacts 45 and 46, member 40, wire 69, current coil 70, wire 72, to the reverse current relay R, ammeter A and battery B and back to the opposite side of the machine through the ground and brush 27. When the current in coil 70 reaches a predetermined value the flux set up in the core 73 will be sufficient to draw armature 66 downward and open contacts 67. The output of the machine will then be reduced by reason of the fact that a resistance 74 will be cut into series with the shunt field coils 13. It will be understood that the armature 66 will vibrate and rapidly open and close contacts 67, thereby cutting in and out the resistance 74 with respect to the field 13 of the machine. This will maintain the current at a substantially constant value as is customary in current regulators of this type.

However, when the machine heats up the thermostatic device which is preferably in heat receiving relation with the commutator will open. When this occurs the action of the current regulating device is modified in the following manner:

By reason of the fact that the bi-metallic thermostatic member 43 has bowed under the influence of heat, contacts 45 and 46 will open. Therefore, current can no longer flow in wire 69. Charging current will, however, flow from brush 28 through wire 52, through current coils 71 and 70 around magnetic core 73. It will therefore be seen that the current coil which effects the actuation of armature 66 has inserted in it an additional number of turns, namely, those coils indicated at 71. This causes a greater magnetic flux to be set up in the core 73, and the armature 66 will remain open for a greater period of time, thereby keeping the resistance 74 in the field for a greater period of time and thereby cutting down the output of the machine still further. This system of regulation will give a substantially constant current output at high engine speed for a certain degree of temperature, and when the thermostatic element heats up this output will be correspondingly cut down. This system is particularly advantageous in charging batteries where conditions to be met in the winter and summer are different, and particularly in charging batteries used on automobiles where the demand for current from the battery may be greater in winter than in summer, and the battery charge rate may be maintained at a relatively high value for a longer period in winter than in summer. When the outside temperature is relatively low, the thermostat element 43 will remain in closed position for a time longer than when the outside temperature is relatively higher.

*Thermostatically controlled bucking field.*

In the construction shown in Figs. 3 and 4, I employ a shunt field 13, as heretofore, and also a bucking field 13ª. The thermostat is so associated that it is adapted to control the action of the bucking field.

Referring now to Fig. 3, when the armature starts to rotate current will flow from brush 28, wire 81, field coils 13, to ground and back through 27 to the commutator. Current also flows from 28 through wire 52, member 43, contacts 45, 46, member 40, wire 83, bucking series coils 13ª, wire 72, reverse current relay R to battery B. The coils 13ª effect the usual bucking field regulation of output until the machine heats up and the thermostat opens. Then the number of turns in the bucking field is modified to further reduce the output of the machine.

When the thermostat is open current will flow in the following circuit: From brush 28 through the shunt field coils 13, as heretofore, also from brush 28 through wire 52, wire 82 (contacts 45, 46 being open) through supplementary bucking coils 13ᵇ, through bucking coils 13ª, wire 72, reverse current relay R and battery B. The coils 13ᵇ being in series with 13ª, are adapted to cause a further reduction in current output.

*Bucking field with thermostatically controlled shunt field.*

In the construction shown in Fig. 4 I insert resistance in the shunt field coil circuit when the thermostat opens. When the armature starts to rotate current will flow from brush 28, wire 51, member 43, contacts 45, 46 (now closed) member 40, shunt field coils 13 back through ground to brush 27 and back to the commutator. Current will also flow from brush 28, wire 51, wire 82, bucking coils 13ª, wire 72, reverse current relay R, ammeter A to battery B. This will effect the usual bucking series regulation. When the thermostat opens contacts 45 and 46 will open, establishing the following circuit: from brush 28, wire 51, resistance 48, member 40, shunt field coils 13, back through ground to brush 27 and to the commutator 20. The current will flow in bucking coils 13ª, as heretofore. The additional resistance 48 in the shunt field circuit cuts down the shunt field excitation and thereby further reduces the output of the machine.

It will be understood that my invention is susceptible of various modifications as will occur to those skilled in the art. What I claim as my invention will be more particularly defined in the appended claims.

I claim:

1. In a regulating system, the combination with a work circuit and a dynamo electric machine, having field coils; of a regulating device for the output thereof comprising means for varying the strength of the field in accordance with the current output of the machine; and a separate thermostatic device in heat receiving relation with the machine and adapted to coöperate with the aforesaid means to reduce the current output upon the attainment of a predetermined temperature in the machine.

2. In a regulating system, the combination with a work circuit and a dynamo electric machine having field coils; of a regulating device for the current output thereof, said device comprising a vibrating armature adapted to vary the field strength in accordance with current output to thereby limit said output; and a separate thermostatic device in heat receiving relation with the machine and coöperating with the aforesaid current regulating device to modify the action of the vibrating armature and thereby to reduce the current output upon the attainment of a predetermined temperature.

3. In a regulating system, the combination with a dynamo electric machine and a regulating device having a series current coil, a core therein, an armature operated thereby, a regulating resistance, said resistance being adapted to be cut into or out of circuit in accordance with the movement of the armature under the influence of the aforesaid magnetizable core, of thermostatically operated means for varying the number of turns of the aforesaid series coil when said thermostatic means attains a predetermined temperature, whereby the output of the machine is varied.

4. In a regulating system, the combination with a dynamo electric machine and a regulating device including a controlling magnet winding; of thermostatically operated means for varying the number effective turns of said winding when said thermostatic means attains a predetermined temperature, whereby to vary the operation of said regulating device.

5. In a regulating system, the combination with a dynamo electric machine and a regulating device including a controlling magnet winding; of a thermostatic switch normally shortcircuiting a portion of said magnet winding, but operating at a predetermined temperature to open said short circuit whereby to vary the operation of said regulating device.

In testimony whereof I hereunto affix my signature.

OLIVER F. CONKLIN.